INVENTORS
HERBERT BAYER
FRANK COENNING
BY
Karl F. Ross
ATTORNEY

United States Patent Office 3,488,582
Patented Jan. 6, 1970

3,488,582
SYSTEM FOR GENERATING A SPECTRUM OF BEAT FREQUENCIES TO MEASURE HARMONICS OF A TEST FREQUENCY
Herbert Bayer and Frank Coenning, Reutlingen, Germany, assignors to Wandel & Goltermann, Reutlingen, Germany, a corporation of Germany
Filed Mar. 6, 1967, Ser. No. 621,487
Claims priority, application Germany, Mar. 5, 1966, W 41,075
Int. Cl. G01r 27/02
U.S. Cl. 324—57          10 Claims

ABSTRACT OF THE DISCLOSURE

System for applying a test frequency $f_t$ to an input of an electrical component and measuring specific harmonics (usually including the fundamental) of the test frequency in the output of the component to be tested, the measuring being performed by heterodyning the harmonic spectrum from the tested component with a beat frequency $f_{rb}$ so chosen that its algebraic combination with a desired $r$th harmonic $rf_t$ of the test frequency yields an invariable intermediate frequency $f_i$; the beat frequency $f_{rb}$ is composed from a corresponding multiple $rf_b$ of a basic beat frequency $f_b$ and a multiple $(r-1)f_i$ of the intermediate frequency produced with the aid of interchangeable or adjustable frequency multipliers and/or dividers, thus enabling selection of an indefinite number of values of $r$ with only three frequency generators. Given the relationship $f_t=f_b\pm f_i$, one of the three generators may be represented by a modulator receiving the outputs of the two other generators; with such an arrangement the test frequency $f_t$ or the beat frequency $f_b$ may be varied to indicate the behavior of the tested component over a selected range of fundamental frequencies and their harmonics by displaying the amplitudes of these frequencies on an oscilloscope screen.

---

Figure 1:
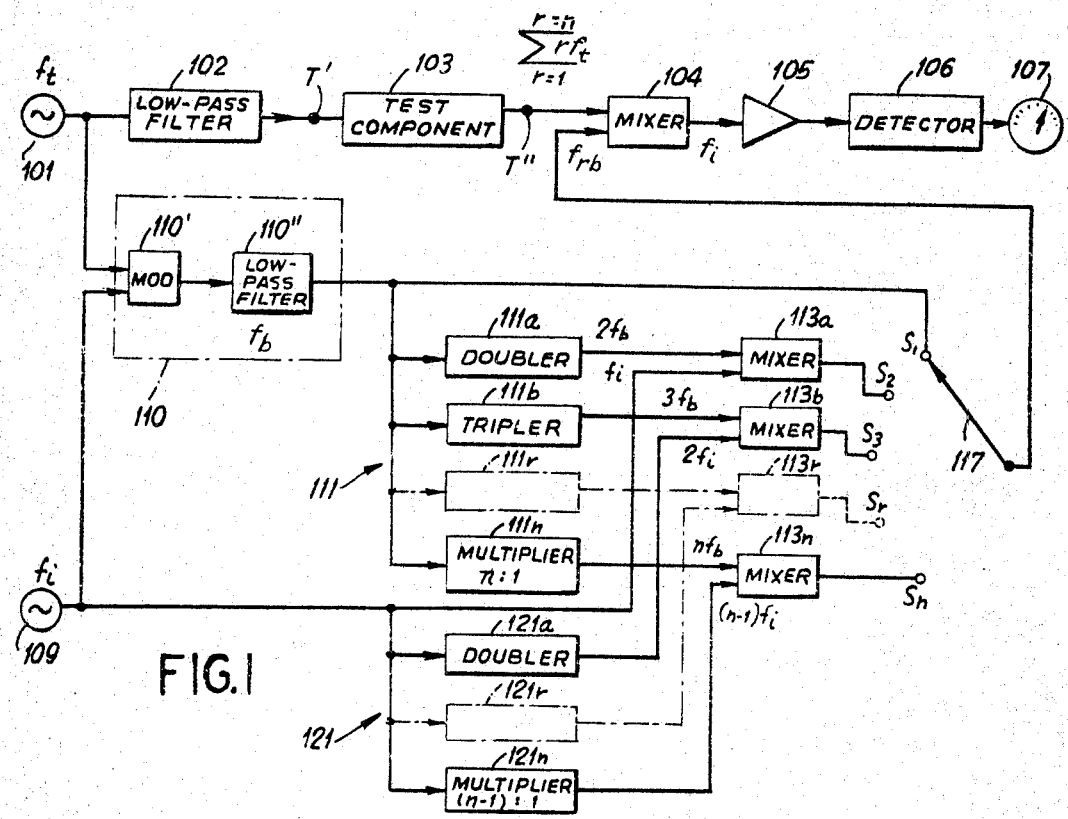

Our present invention relates to a system for the measuring of different harmonics, preferably including the first harmonic or fundamental, of a test frequency applied to a resonator, damping network or other electrical component to be tested.

In such systems it is customary to utilize a relatively high frequency as the test frequency $f_t$ and to heterodyne at least a portion of the resulting harmonic spectrum in the output of that component with different beat frequencies $f_b, f_{2b}, f_{3b} \ldots f_{nb}$ so chosen that the difference between the selected beat frequency and a corresponding harmonic $f_t, 2f_t \ldots nf_t$ equals an invariable intermediate frequency $f_i$ whose amplitude, for a particular beat frequency, will be a measure of the amplitude of the associated harmonic as emitted by the tested component. Heretofore, such a system required a large number of stabilized oscillators to furnish the range of beat frequencies needed for this purpose; any readjustment of the fundamental test frequency, e.g. for the purpose of exploring the response of the tested component in a different part of the spectrum, necessitated complicated and time-consuming resetting of all the beat-frequency generators.

The general object of our present invention, therefore, is to provide a system of the type set forth in which the need for independently adjusting a large number of oscillation generators is avoided.

A more particular object of the invention is the provision of means in such system for concurrently wobbling or otherwise modifying the outputs of the generators of the test and beat frequencies in such a way that switchovers from one harmonic to another may be carried out without retuning, regardless of the frequency variations introduced.

These objects are realized, pursuant to our present invention, by the provision of respective generators for the test frequency $f_t$, the fundamental beat frequency $f_b$ and the intermediate frequency $f_i$, in combination with interchangeable and/or adjustable frequency converters (i.e. multipliers and/or dividers) for producing a selected beat frequency $f_{rb}$ for the $r$th harmonic by deriving from the beat-frequency generator a multiple $rf_b$ of the beat frequency $f_b$ and from the intermediate-frequency generator a multiple $(r-1)f_i$ of the intermediate frequency, the algebraic sum $rf_b\pm(r-1)f_i$ of these multiples constituting the beat frequency $f_{rb}$. Thus, it is only necessary to change the multiplication or division ratio of the frequency converters in order to switch from one harmonic to another, no retuning of any of the frequency generators being required.

Inasmuch as the three frequencies $f_t$, $f_b$ and $f_i$ bear the relationship $f_t=f_b\pm f_i$, one of the three aforementioned frequency generators—preferably the one for the test frequency $f_t$ or the one for the beat frequency $f_b$—may be represented by a modulator receiving the outputs of the two other generators; if one of these latter generators (i.e. the one producing a frequency other than $f_i$) is adjusted in steps or continuously (wobbled), the same adjustment will be reflected in the frequency of the modulator output so that frequencies $f_t$ and $f_b$ vary conjointly and $f_i$ remains constant. Since the multiplication and/or division ratios of the frequency conveters remain unchanged by the wobbling, the system will operate without retuning over a wide range of test frequencies $f_t$.

In many instances it will be convenient to use as the beat-frequency generator an oscillator tuned not to the fundamental beat frequency $f_b$ but to a multiple $kf_b$ of that frequency, $k$ being an integer divisible by integers $r_1, r_2, \ldots r_n$ representing the orders of all the test-frequency harmonics $r_1f_t, r_2f_t, \ldots r_nf_t$ to be measured. Thus, if $r_1, r_2$ etc. are relative primes, $k$ may simply be the product $r_1, r_2, \ldots r_n$; if they have common factors, $k$ should be their lowest common multiple.

Figure 3:
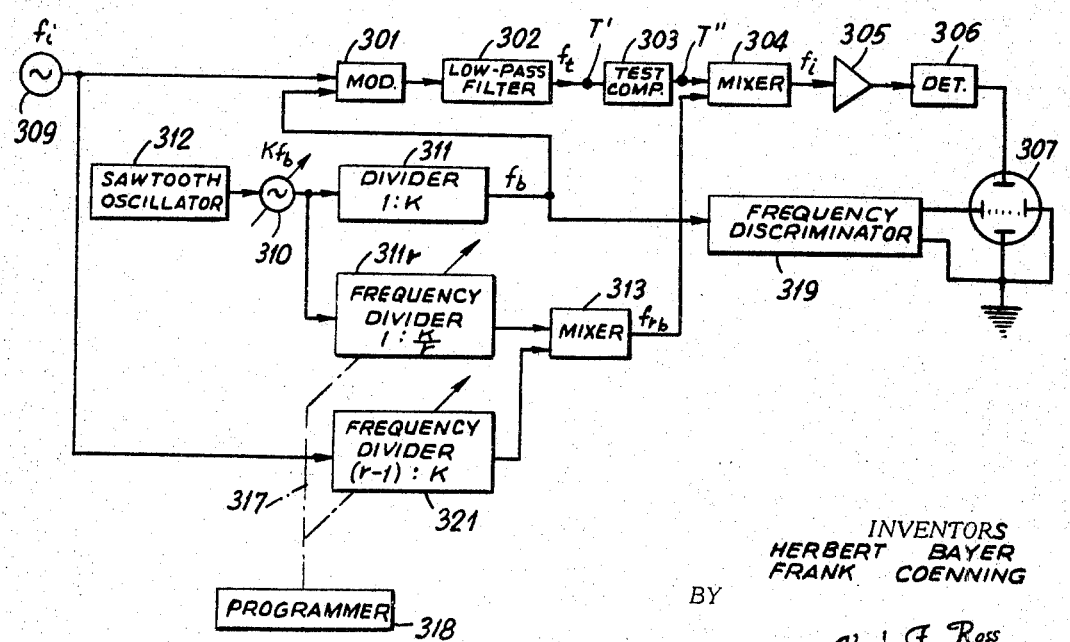
Figure 2:
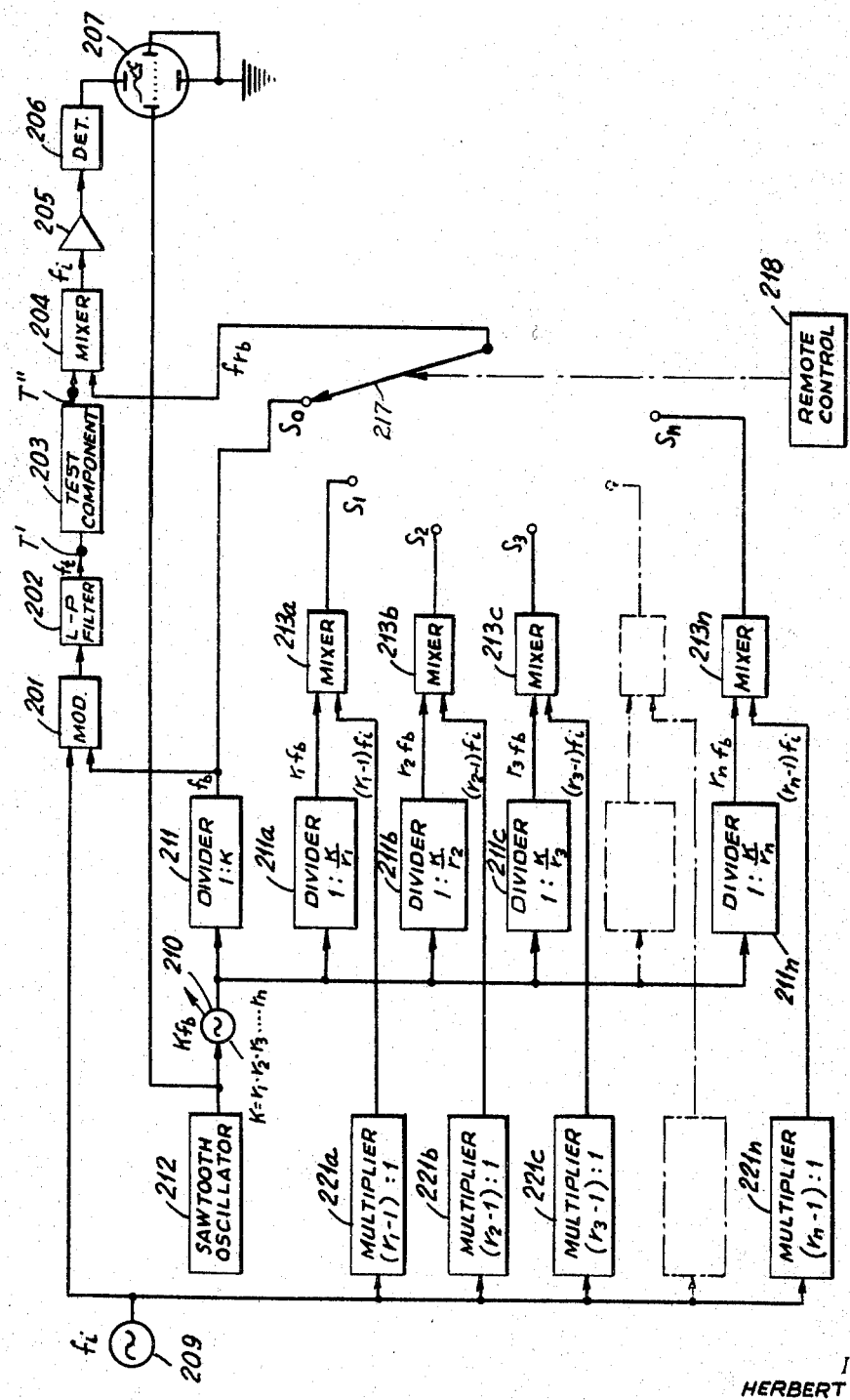

The invention will be described in greater detail with reference to the accompanying drawing in which FIGS. 1, 2 and 3 are circuit arrangements representing different embodiments.

In FIG. 1 we have shown a first oscillation generator 101 producing a test frequency $f_t$; a second oscillation generator 110 producing a fundamental beat frequency $f_b$; and a third oscillation generator 109 producing an intermediate frequency $f_i=f_t-f_b$. The second oscillation generator 110 is constituted, in this particular embodiment, by a modulator 110' and a low-pass filter 110'' for synthesizing the beat frequency $f_b$ from the algebraic combination (here the difference) of frequencies $f_t$ and $f_i$. It will be understood that, in principle, test frequency $f_t$ may be either higher or lower than beat frequency $f_b$, the difference being equal to $f_i$ in either case.

Oscillator 101 works into a low-pass filter 102, designed to suppress spurious harmonics, whose output is delivered to an input terminal T' of a component 103 to be tested. At an output terminal T'' of this component a frequency spectrum $$\sum_{r=1}^{r=n} rf_t$$

appears which consists of the fundamental $f_t$ and higher harmonics $rf_t$ ($r$ being any integer within the range of interest 1 through $n$). A mixer 104 receives the frequency spectrum from test component 103 along with a beat frequency $f_{rb}$ from a selector switch 117, the combination of this beat frequency with a selected harmonic $rf_t$ yielding the intermediate frequency $f_i$ in the output of the mixer. Upon selective amplification in an amplifier 105, this intermediate frequency is applied to a detector 106 whose output is registered by an indicator 107.

For the generation of beat frequency $f_{rb}$, a group 111 of frequency multipliers 111a, 111b, ... 111n are connected in parallel to the output of beat-frequency generator 110 while a group 121 of similar frequency multipliers 121a ... 121 (n—1) are connected in parallel across the output of intermediate-frequency generator 109. Network 111a of group 111 is a frequency doubler, network 111b is a frequency tripler, and so on, with network 111n providing a multiplication ratio of $n:1$. In an analogous manner, the first network 121a of group 121 is shown as a doubler while the last network 121(n—1) thereof is a multiplier with a ratio (n—1):1. Switch 117 has a first bank contact $S_1$ connected directly to the output of oscillation generator 110 to receive from it the fundamental beat frequency $f_b$; a second bank contact $S_2$ connected to the output of a mixer 113a which receives the outputs $2f_b$ and $f_i$ from network 111a and generator 109, respectively, to synthesize the second-order beat frequency $f_{2b}$; a third bank contact $S_3$ connected to the output of a mixer 113b which receives frequency $3f_b$ from network 111b and frequency $2f_i$ from network 121a to produce the third-order beat frequency $f_{3b}$; one or more intermediate bank contacts $S_r$ analogously connected to mixers 113r supplied from intermediate networks 111r and 121r to receive other beat frequencies $f_{rb}$; and a final bank contact $S_n$ tied to the output of a mixer 113n which derives the highest-order beat frequency $f_{nb}$ from its synthesized constituents $nf_b$ and $(n-1)f_i$ respectively supplied by networks 111n and 121(n—1).

Naturally, the beat-frequency generator 110 could also be replaced by an independent oscillator tuned to the desired output frequency $f_b$, yet the illustrated arrangement automatically translates any shift in the operating frequency of oscillator 101 into a corresponding adjustment of the operating frequency of generator 110 while leaving unchanged the intermediate frequency $f_i$ produced by oscillator 109. It will thus be noted that only two or, at most, three oscillators will be needed to select and measure any of the harmonics in the spectrum appearing on terminal T″, such selection being effected merely by a change in the position of switch 117 which may be displaced manually or automatically (e.g. by remote control or with the aid of a programmer as illustrated in FIGS. 2 and 3).

In the system of FIG. 2 we have used similar reference numerals, differing from those of FIG. 1 merely by the substitution of a "2" in the position of the hundreds digit, to designate analogous elements. The generator for the production of the beat frequency comprises, in this embodiment, a variable oscillator 210 whose output is a multiple $kf_{fb}$ of the fundamental beat frequency $f_b$ and is fed to a frequency divider 211 having a division ratio of $1:k$ so as to give rise to frequency $f_b$. The output of divider 211 is applied to one input of a modulator 201 whose other input receives the intermediate frequency $f_i$ from a fixed-frequency oscillator 209. The combination of the relatively high frequency $f_b$ and the relatively low frequency $f_i$ produces the test frequency $f_t$ which is selected by a circuit 202 (here a low-pass filter) and applied to input terminal T′ of test component 203. Output terminal T″ of this test component is connected to one input of a mixer 204 whose other input receives a selected beat frequency $f_{rb}$ from a switch 217; the resulting frequency $f_i$ in the output of mixer 204 is selectively amplified at 205 and passed through a detector 206 for delivery to an indicator 207 here shown as a cathode-ray oscilloscope.

Connected in parallel to the output of oscillator 210 are a plurality of further frequency dividers 211a, 211b, 211c, ... 211n. The factor $k$ is chosen to be a multiple of several integers $r_1, r_2, r_3, ... r_n$ which represent the orders of the higher harmonics to be measured in the output of component 203. Thus, for example, if only the second and third harmonics are to be measured, $k$ would be equal to 6; if also the fourth harmonic is interest, its magnitude would be 12. The division ratios of the dividers 211a, 211b, 211c, ... 211n is, respectively, $$1:\frac{k}{r_1}, 1:\frac{k}{r_2}, 1:\frac{k}{r_3}, \cdots 1:\frac{k}{r_n}$$

so that their output frequencies are given as $r_1f_b$, $r_2f_b$, $r_3f_b$, ... $r_nf_b$, respectively. A group of frequency multipliers 221a, 221b, 221c, ... 221n are similarly connected in parallel to the output of oscillator 209, their multiplication ratios being respectively equal to $(r_1-1):1$, $(r_2-1):1$, $(r_3-1):1$, ... $(r_n-1):1$; if any of the "$r$" values is equal to 2, the corresponding multiplier will of course be replaced by a short circuit. The outputs of respective dividers 211a, 211b etc. and multipliers 221a, 221b etc. are combined in associated mixers 213a, 213b, 213c, ... 213n which deliver respective beat frequencies $b_{b1}$, $f_{b2}$, $f_{b3}$, ... $f_{bn}$ to corresponding bank contacts $S_1$, $S_2$, $S_3$, ... $S_n$ of switch 217, the first bank contact $S_0$ of the switch being directly connected to the output of the divider 211 to receive from it the fundamental beat frequency $f_b$.

The operation of the embodiment of FIG. 2 so far described is analogous to that of the system of FIG. 1 and will be readily understood from the foregoing description. In addition, however, we have illustrated in FIG. 2 the possibility of wobbling, i.e. progressively varying, the two frequencies $f_t$ and $f_b$ in a manner leaving unaffected the intermediate frequency $f_i$ selectively passed by amplifier 205. To this end, oscillator 210 is of the adjustable type and is shown controlled by a sawtooth oscillator 212 whose output voltage is also applied to a sweep circuit of oscilloscope 207 here represented by a pair of horizontal deflecting electrodes; the signal from detector 206 is impressed upon the associated veritcal electrodes of the oscilloscope. The oscilloscope screen may be suitably calibrated to indicate the value of test frequency $f_t$ for any position of adjustment of oscillator 210, the amplitude of any selected harmonic of that test frequency in the output of complement 203 being then visible as a curve $c$ on that screen.

FIG. 2 also illustrates the possibility of adjusting the selector switch 217 with the aid of a remote-control actuator 218.

Reference will now be made to FIG. 3 where elements analogous to those of the preceding figures are designated by similar reference numerals having a "3" in the position of the hundreds digit.

The system of FIG. 3 includes, like the preceding embodiment, a variable oscillator 310 for the generation of frequency $kf_b$ and a fixed oscillator 309 to produce the frequency $f_i$; the later frequency, along with fundamental beat frequency $f_b$ obtained from oscillator 310 through the intermediary of a frequency divider 311, is fed to a modulator 301 whose output frequency $f_t$ is selected by a filter 302 for delivery to input terminal T′ of the component 303 to be tested. The harmonic spectrum appearing on the output terminal T″ of this component is again heterodyned with a beat frequency $f_{rb}$ to produce the intermediate frequency $f_i$ which, upon passage through amplifier 305 and detector 306, reaches the vertical deflecting electrodes of oscilloscope 307. Oscillator 310 can again be wobbled by the output of a sawtooth-voltage generator 312 which, however, does not directly energize the sweep circuit of the oscilloscope; instead, the varying beat frequency $f_b$ is fed to a frequency discriminator 319 whose output energizes the horizontal deflecting electrodes of the oscilloscope.

Finally, FIG. 3 shows the replacement of the parallel-connected frequency converters 111, 121 etc. by a pair of adjustable converters 311r and 321, ganged together for mechanical or electronic control via a link 317 by a programmer 318. Converter 311, connected to the output of oscillator 310, is a frequency divider with a division ratio of $$1:\frac{k}{r}$$

where $r$ is representative of any of the integers $r_1 \ldots r_n$ indicated in FIG. 2; converter 321, connected to the output of oscillator 309, is a frequency multiplier with a multiplication ratio of $(r-1):1$. In the position $r=k$, network 311$r$ constitutes a short circuit; in the position $r=1$, in which the output of network 311$r$ equals $f_b$, network 321 is open-circuited. The outputs of converters 311$r$ and 321 are combined in a mixer 313 which delivers a variable beat frequency $f_{rb}$, under the control of programmer 318, to mixer 304.

It is to be understood that the features disclosed in connection with different embodiments may be combined or interchanged, within the limits of compability, and that other modifications readily apparent to persons skilled in the art (e.g. the use of mechanical rather than electronic means for wobbling the oscillators) are also intended to be embraced within the spirit and scope of our invention.

We claim:

1. A circuit arrangement for measuring of a test frequency in the output of an electrical component energized with said test frequency, comprising first generator means for said test frequency $f_t$ connectable to an input of a component to be tested; second generator means for producing a beat frequency $f_b$ differing from said test frequency $f_t$ by the magnitude of a predetermined intermediate frequency $f_i$; third generator means for producing said intermediate frequency $f_i$; adjustable frequency-converter means coupled to said second and third generator means for deriving therefrom two constituent frequencies $rf_b$ and $(r-1)f_i$ of a variable heterodyning frequency $f_{rb}=rf_b-(r-1)f_i$, wherein $r$ is any one of several integers, and for combining said constituent frequencies to form said heterodyning frequency $f_{rb}$; switch means for selectively adjusting said frequency-converter means to different values of $r$ corresponding to the order of a harmonic to be measured; mixer means having a first input terminal connected to said frequency-converter means and having a second input terminal connectable to the output of said component for differentially combining said heterodyning frequency $f_{rb}$ with spectrum of harmonics of said test frequency $f_t$ generated by said component whereby the $r$th harmonic in said spectrum gives rise to said intermediate frequency $f_i$; and indicator means connected to said mixer means for registering the amplitude of said $r$th harmonic in different operating positions of said switch means.

2. A circuit arrangement as defined in claim 1 wherein one of said generator means comprises modulator means connected to the other two of said generator means for algebraically combining two of the three frequencies $f_t$, $f_b$, $f_i$ to produce the third of said three frequencies.

3. A circuit arrangement as defined in claim 2 wherein said two of said generator means connected to said modulator means include said third generator means, further comprising control means for progressively varying the operating frequency of the other generator means of said pair while maintaining $f_i$ constant, said indicator means including a sweep circuit synchronized with said control means for displaying the amplitude of said $r$th harmonic with different values of $f_b$ and $f_t$.

4. A circuit arrangement as defined in claim 3 wherein said control means comprises a sawtooth oscillator, said second generator means including a variable oscillator connected to be controlled by the output of said sawtooth oscillator.

5. A circuit arrangement as defined in claim 4 wherein said sawtooth oscillator has an output connected to said sweep circuit.

6. A circuit arrangement as defined in claim 4, further including frequency-discriminator means connected to receive said beat frequency $f_b$ from said second generator means for deriving therefrom a control voltage for said sweep circuit.

7. A circuit arrangement as defined in claim 1 wherein said second generator means comprises an oscillator tuned to an output frequency $kf_b$ and said frequency-converter means includes a plurality of dividing networks with different division ratios $r:1$ where $k$ is a multiple of $r$.

8. A circuit arrangement as defined in claim 1 wherein said frequency-converter means comprises two groups of networks with different conversion factors, the networks of one group being connected in parallel across the output of said second generator means, the networks of the other group being connected in parallel across the output of said third generator means, and mixing circuits for combining the outputs of associated networks of both groups.

9. A circuit arrangement as defined in claim 1 wherein said frequency-converter means comprises a first adjustable converter connected to the output of said second generator means, a second adjustable converter connected to the output of said third generator means, and a mixing circuit connected to the outputs of said converters.

10. A circuit arrangement as defined in claim 1 wherein said frequency-converter means is provided with automatic switching means for shifting between different values of $n$.

References Cited

UNITED STATES PATENTS

| | | | |
|---|---|---|---|
| 2,970,258 | 1/1961 | Sinclair | 324—57 |
| 3,369,176 | 2/1968 | Palatinus | 324—57 |

EDWARD E. KUBASIEWICZ, Primary Examiner